United States Patent [19]
Akeno et al.

[11] Patent Number: 5,792,408
[45] Date of Patent: Aug. 11, 1998

[54] MOLDED SURFACE FASTENER, AND METHOD AND APPARATUS FOR MANUFACTURING THE SAME

[75] Inventors: Mitsuru Akeno; Ryuichi Murasaki, both of Toyama-ken, Japan

[73] Assignee: YKK Corporation, Tokyo, Japan

[21] Appl. No.: 872,221

[22] Filed: Jun. 10, 1997

Related U.S. Application Data

[62] Division of Ser. No. 742,202, Oct. 31, 1996.

[30] Foreign Application Priority Data

Jun. 6, 1996 [JP] Japan ................. 8-144166

[51] Int. Cl.⁶ ................. B29C 49/00; B29C 47/00
[52] U.S. Cl. ................. 264/284; 264/328.11; 24/452
[58] Field of Search ................. 24/306, 442–452, 24/575–577; 264/167, 328.11, 280, 284; 425/224, 363, 190

[56] References Cited

U.S. PATENT DOCUMENTS

| | | | |
|---|---|---|---|
| 3,147,528 | 9/1964 | Erb | 24/452 |
| 3,266,113 | 8/1966 | Flanagan, Jr. | 24/452 |
| 3,408,705 | 11/1968 | Kayser et al. | 24/452 |
| 3,522,637 | 8/1970 | Brumlik | 24/451 X |
| 3,594,863 | 7/1971 | Erb | 264/167 X |
| 3,879,835 | 4/1975 | Brumlik | 24/452 X |
| 3,921,259 | 11/1975 | Brumlik | 24/451 |
| 4,169,303 | 10/1979 | Lemelson | 24/452 |
| 4,198,734 | 4/1980 | Brumlik | 24/451 X |
| 4,307,493 | 12/1981 | Ochiai | 24/445 |
| 4,454,183 | 6/1984 | Wollman | 24/306 X |
| 4,872,243 | 10/1989 | Fischer | 24/452 X |
| 5,067,210 | 11/1991 | Kayaki | 24/452 |
| 5,131,119 | 7/1992 | Murasaki et al. | 24/452 |
| 5,441,687 | 8/1995 | Murasaki et al. | 264/167 |
| 5,512,234 | 4/1996 | Takizawa et al. | 264/167 X |
| 5,537,720 | 7/1996 | Takizwa et al. | 24/452 |
| 5,604,963 | 2/1997 | Akeno | 24/542 |

*Primary Examiner*—Peter M. Cuomo
*Assistant Examiner*—Robert J. Sandy
*Attorney, Agent, or Firm*—Hill & Simpson

[57] ABSTRACT

A molded surface fastener comprises: a substrate sheet; and a multiplicity of engaging elements standing on one surface of the substrate sheet, each of the engaging elements being composed of a stem rising from the one surface of the substrate sheet, and an engaging head projecting from an upper end of the stem for detachably engaging a companion loop. After a surface fastener is manufactured on a die wheel by continuous injection molding as a primary-intermediate, a heating and pressing roller disposed downstream of the die wheel presses the engaging head, while heating, to bend the engaging head from the stem and, at the same time, to form a pair of protuberances projecting in opposite directions from opposite side edges of the top of the engaging head perpendicularly with respect to a direction lengthwise of the engaging head.

2 Claims, 14 Drawing Sheets

MOLDED SURFACE FASTENER, AND METHOD AND APPARATUS FOR MANUFACTURING THE SAME

This is a division, of application Ser. No. 08/742,202, filed Oct. 31, 1996.

BACKGROUND OF THE INVENTION

1. Field of the Invention

This invention relates to a synthetic resin molded surface fastener composed of a substrate sheet with a multiplicity of engaging elements on the substrate sheet and manufactured by extrusion, continuous injection, or injection molding, and a method and an apparatus for manufacturing the molded surface fastener. More particularly, the invention relates to a molded surface fastener which has minute-size engaging elements for reliable engagement with minute-size loops, which provides secure adequate engaging strength, adequate peeling resistance and a high rate of engagement, which has good durability for repeated use, and is suitable for use in paper diaper or similar goods.

2. Description of the Related Art

Integrally molded surface fasteners in which a substrate sheet and a multiplicity of hooks are integrally and continuously molded using thermoplastic resin are disclosed in, for example, U.S. Pat. Nos. 4,984,339 and 5,441,687. In recent years, application of this kind of surface fasteners is on the increase as connectors for industrial materials, vehicle or interior ornaments and daily goods as well as various kinds of sanitary goods, such as paper diapers. Consequently, various sizes and shapes of engaging elements formed on a surface of the substrate sheet are required to cope with the above-mentioned various uses.

However, as is understood from the above-mentioned U.S. Patent Specifications, it is a common knowledge that with the conventional molding apparatus for continuous, integrally molded surface fastener, it is difficult to obtain an acceptable molded surface fastener that is delicate, and excellent in touch, in view of technological difficulty in the molding process. Assuming that minute-size engaging elements were molded, only a very low degree of strength could be achieved, so that the resulting molded surface fastener was of little practical use. Further, in the foregoing integrally molded hook-shape structure, the stem has a simple cross-sectional shape and can bend transversely or longitudinally of the engaging element row from its base end much easier when the size of the engaging elements is smaller. In addition, for the simple shape and excessive softness of the hook-shape engaging elements, adequate engaging strength could not be secured so that the engaging elements can be easily removed off the companion loops. As a result, the engaging elements gradually became unable to restore their original posture after repeated use, thus reducing the rate of engagement with the loops in a short period of time. Further, hook-shape engaging heads molded as mentioned above had a low degree of engaging strength because of their simple shapes and excessive softness, so that they were easily out of engagement. Therefore, in order to obtain adequate rigidness and adequate engaging strength, it was considered necessary to increase the individual hook-shape engaging elements in size, making the resulting engaging elements too rigid and reducing the number of hooks per unit area (hook density). As a result, the molded surface fastener became unable to engage minute-size companion loops.

In order to overcome the foregoing problems, integrally molded surface fasteners having minute-size engaging elements were proposed by, for example, International Publication No. WO94/23610, U.S. Pat. No. 5,077,870, Japanese Patent Laid-Open Publications Nos. Hei 2-5947 (U.S. Pat. No. 4,894,060).

The engaging elements of the molded surface fastener disclosed in International Publication No. WO94/23610 and U.S. Pat. No. 5,077,870 have mushroom shapes instead of hook shapes. As compared to the prior art hook-shape engaging elements, the mushroom-shaped engaging elements can secure a desired degree of strength in engagement with the companion loops though they are reduced to a minute size. Therefore, the mushroom-type surface fastener is suitable for uses requiring adequate softness. However, with the engaging element having such a structure, the neck portion connecting the stem and its engaging head gets entangled with a plurality of loops at the time of engagement with the companion loops, tends to be broken at the neck portion and is therefore not durable for repeated use.

The molded surface fastener disclosed in Japanese Laid-Open Publication No. Hei 2-5947 has an ordinary hook-type structure well known in the art, in which a multiplicity of generally J-shape or palm-tree-shape engaging elements stand on the substrate sheet. However, this molded surface fastener can be manufactured inexpensively and can be used with a non-woven-cloth companion surface fastener, which also can be manufactured inexpensively as compared to an ordinary fiber pile woven cloth. Therefore, this molded surface fastener is particularly suitable for use in various disposable underwear and paper diaper. In the molded surface fastener, considering that adequate peeling resistance with respect to pile fibers of a non-woven cloth cannot be obtained by the minute-size single-head engaging element, the density of engaging elements is set to be relatively large in an effort to provide general engaging and peeling strength with respect to the minute pile fibers.

As with the engaging element disclosed in the abovementioned publication, merely making the engaging element very small in size and large in density or only changing the shape of the engaging elements into a simple one, does not assure the required shearing strength and the peeling strength during engagement with the companion non-woven cloth. So, even if the density of the hook-shape engaging elements is extremely large, the engaging heads push down the very soft fiber loops, which are closely and randomly arranged, of the companion non-woven cloth or fall flat themselves when an attempt is made to penetrate the hook-shape engaging heads into the dense fiber loops. As a result, the engaging elements become unable to penetrate into the fiber loops, so a lowered rate of engagement as compared to the ordinary surface fastener cannot be avoided.

For the foregoing reasons, in the molded surface fastener having the above-mentioned minute-size engaging elements, limitation would necessarily occur either in reducing the size of the engaging elements or in increasing the density of the engaging elements. The disclosure of Japanese Patent Laid-Open Publication No. Hei 2-5947 is totally silent about critical values, though the preferable parameters of various portions of the engaging element are defined, in which the density of engaging elements is preferably 70–100/cm$^2$, the height of engaging elements is 0.8–1.1 mm, the thickness of stem and the width of engaging head (horizontal width perpendicular to an extending direction the length of the engaging head) is preferably 0.46 mm, the width of the stem (thickness in the extending direction lengthwise of the engaging head) is 0.18–0.30 mm, and the length of engaging head projecting from the stem is preferably 0.25–0.37 mm or less than 1 mm.

These numeric values are determined to provide the integrated strength in both the shearing direction and the peeling direction, since the engaging element has an ordinary shape considering no unique shape for minute size based on a recognition that the shearing strength and the peeling strength during engaging are extremely low.

Assuming that the engaging element has an ordinary J shape, it is necessary to set the distance between the lower surface of the distal end of the engaging head and the uppermost point of the engaging head as small as possible, and to set both the distance between the lower surface of the distal end of the engaging head and the front surface of the substrate sheet, and the distance between adjacent engaging hooks at least several times larger than the actual size of the companion loops. Consequently, the parameters of the conventional engaging element are determined in relation to the size of the companion loops. For example, even when molding the very soft and minute-size engaging elements suitable for use in paper diaper, it is inevitable to set the curvature of the engaging head large to secure the necessary engaging strength, and the minimum necessary distance between the lower surface of the distal end of the engaging head and the front surface of the substrate sheet for the loop to enter is determined univocally.

This means that, when securing a predetermined rate of engagement, either the height or density of the engaging element is univocally decided so that the height cannot be set to a lower value. Therefore, assuming that either the resin material or the hook weight is constant, it is difficult to improve the strength in both the shearing direction and the peeling direction during engagement unless the engaging element structure is improved. Also, since the uppermost portion of the engaging head of the engaging element rising directly from the front surface of the substrate sheet is curved, it is impossible to make the touch of the engaging-side surface of the surface fastener smoother, and this curved top shape would be a cause for increasing the size of the companion loop and would obstruct the insertion of the engaging head into the loop when the loops are to be smaller. Further, even if the whole engaging element is merely reduced into a minute size, the whole hook-shape engaging head would inevitably be flexed forwardly or sideways when depressed so that the engaging head becomes further unable to engage the companion loops, thus lowering the rate of engagement of the whole surface fastener considerably.

Generally, when making the engaging elements minute in size as mentioned above, in order to secure adequate softness of the whole surface fastener, the thickness of the substrate sheet must be reduced. However, if the thickness of the substrate sheet is very small, it tends to extend uniformly or to be easily torn out when the engaging elements of the molded surface fastener are separated from the die during continuous molding, thus causing non-stable molding. Yet if the molding itself could be finalized without trouble, the molded substrate sheet would become wavy or puckered, thus making the molded surface fastener not durable for practical use.

SUMMARY OF THE INVENTION

It is therefore an object of this invention to provide a molded surface fastener which can reliably engage with even minute dense fiber pile loops such as of a non-woven cloth, can secure adequate shearing and peeling resistance of individual engaging elements during engagement, can improve the touch of the engaging-side surface, can be reduced in height of engaging elements above one surface of the substrate sheet as compared to the conventional surface fastener, can prevent engaging heads from extreme lateral and forward bending, can secure a high rate of engagement with the loops of the companion surface fastener, have adequate durability against repeated loading, and can secure desired softness and tearing strength of the substrate sheet.

According to a first aspect of the invention, these objects are accomplished by a molded surface fastener comprising: a substrate sheet; and a multiplicity of engaging elements, which constitute a main feature of the surface fastener according to this invention, standing on one surface of the substrate sheet, each of the engaging elements being composed of a stem rising from the one surface of the substrate sheet, and an engaging head projecting from an upper end of the stem for detachably engaging a companion loop; the engaging head extending from the stem so as to be bent and having a pair of protuberances horizontally projecting in opposite directions from opposite side edges of a top of the engaging head perpendicularly with respect to a direction lengthwise of the engaging head.

In the presence of these protuberances, it is possible firstly to make the top surfaces of the engaging heads substantially flat to prevent an itchy touch, and secondly to relatively reduce the length from the one surface of the substrate sheet to an uppermost point of the engaging head, without changing the length from the one surface of the substrate sheet to a lower surface of the engaging head, if the same quantity of resin is used for the top of the engaging head including the protuberances.

A third function of these protuberances, unlike the conventional engaging head having a substantially uniform size in which a companion loop is merely caught with the engaging head curving like a hook, is that the individual loop of the companion surface fastener can become wound around the neck between the stem and the protuberances so as not to be easily removed off the engaging head, thus increasing the engaging strength sharply. Since these protuberances, unlike the conventional mushroom-type engaging element having an umbrella-shape engaging head extending in all directions from the upper end of the stem, exist only on a part of the engaging head extending in one direction of the stem, and allow the loop to smoothly move around the protuberances with a slight frictional resistance, requiring a separating force greater than that with the conventional ordinary hook-shape engaging head and smaller than that with the conventional umbrella-shape engaging head, as the engaging head resiliently deforms to stand up when a peeling force is exerted on the surface fastener. As a result, it is possible to secure a required degree of engaging strength, instead of the minute size of the engaging heads, without causing any damage to either the engaging elements or the loops.

Further, in the presence of the protuberances, it is possible to modify the shape of the engaging head. Namely, since the protuberances cause an increased degree of engaging strength with the loops as mentioned above, it is, possible to bend the whole engaging element into a generally inverted L-shape with the engaging head extending substantially straightway without curving downwardly toward the substrate sheet like the conventional hook-shape engaging head. This facilitates inserting the engaging head through even the minute-size loops, such as short and minute single-fiber pile bristling as part of an ordinary non-woven cloth.

For the minute-size and single-fiber pile, it is preferable that the engaging head is inclined by an angle θ with respect to the horizontal plane, the angle θ satisfying a relation −5°≦θ≦+45° and that the top of the engaging head is inclined by an angle θ' with respect to the horizontal plane, the angle θ' satisfying a relation 0<θ'≦+60°. Even if the conventional J-shape or mere inverted L-shape engaging element assumes the above-defined inclined posture, adequate engaging strength with the companion loops cannot be realized.

Preferably, the top of the engaging head has a substantially flat top surface, from which the protuberances horizontally bulge, so that the engaging-side surface of the surface fastener is improved so as to display a less itchy touch. Also preferably, the engaging head has a higher degree of rigidity than the stem so that an adequate rate of engagement with the companion loops and an adequate degree of peeling resistance can be secured.

Although generally the stem stands upright, at least part of the circumferential surface of the stem may be inclined with respect to the front surface of the substrate sheet. Further, each engaging element may be a single-head structure having a single engaging head extending from the stem in one direction, or may be a double-head structure having two engaging heads branched from the upper end of the stem in a direction perpendicularly to the direction lengthwise f the engaging head, the two engaging heads extending in two parallel vertical planes in opposite directions , respectively. The stem may have a width, which is perpendicular with respect to the direction lengthwise of the engaging head, larger in part than the width of the engaging head. In this case, an uppermost point of the large-width part of the stem may be disposed at a level lower or higher than a extending start point of a lower surface of the engaging head.

Also preferably, the stem has on its opposite side surfaces a pair of reinforcing ribs rising from the one surface of the substrate sheet. Each of the reinforcing ribs connects the stems of an adjacent pair of the engaging elements mutually confronting perpendicularly with respect to the direction lengthwise of the engaging head. Further, the substrate sheet may have at a predetermined number of positions in the one surface thereof a predetermined number of recesses, from bottom surfaces of which the engaging elements stand, each of the recesses having a width large enough to receive the companion loop. Of course, though the presence of the recesses allow the engaging elements to be minute, it is not necessary.

Though these molded surface fasteners may be molded by an ordinary injection molding machine, it is preferable that they are continuously manufactured in the following method on the following apparatus.

According to this invention, an apparatus for manufacturing a molded surface fastener having a substrate sheet and a multiplicity of engaging elements standing on one surface of the substrate sheet, each of the engaging elements being composed of a stem rising from the one surface of the substrate sheet, and an engaging head projecting from an upper end of the stem for detachably engaging a companion loop, comprises: a die wheel adapted to be driven for one-way rotation and having in its circumferential surface a multiplicity of generally L-shape engaging-element-forming cavities; molten resin supplying means for supplying molten resin into a predetermined gap between the molten resin supplying means and the circumferential surface of the die wheel while the latter is rotating; cooling means for positively cooling a primary-primary-intermediate surface fastener attached to a circumferential surface of the die wheel and moving in an arc in response to the rotation of the die wheel; and take-up means for continuously drawing the primary-primary-intermediate surface fastener, which is solidified while moving in response to the rotation of the die wheel, from the circumferential surface of the die wheel; and heating and pressing means disposed downstream of the take-up means so as to confront a path of travel of the top of the engaging head of the primary-primary-intermediate surface fastener, the top of the engaging head being heated and pressed from an upper side thereof to form a pair of protuberances bulging from the top of the engaging head transversely of the top traveling path.

Each engaging-element-forming cavity has a stem-forming cavity opening at the circumferential surface of the die wheel and extending radially substantially toward the axis of the die wheel, and an engaging-head-forming cavity extending circumferentially from an upper end of the stem-forming cavity. The cooling means includes a cooling water jacket disposed inside the die wheel and a cooling water bath disposed outside the die wheel for positively cooling part of the circumferential surface of the die wheel and the molded surface fastener, which is carried on the circumferential surface of the die wheel and is moving with rotation of the die wheel, from the outer side. Further, the heating and pressing means may be a roller having a horizontal axis or plate extending perpendicularly to the path of travel of the primary-intermediate surface fastener, and may include temperature adjusting means and pressure controlling means.

In order to continuously manufacture a molded surface fastener having the foregoing structure by said apparatus, molten resin is continuously injected toward the circumferential surface of a rotating die wheel from a continuous injection nozzle under a predetermined resin pressure so that part of the molten resin is injected into the element-forming cavities of the die wheel, and also is shaped into a substrate sheet along the circumferential surface of the die wheel to form a multiplicity of engaging elements integral with a substrate sheet. As a result, a primary-intermediate molded surface fastener is continuously molded.

As it is moved along substantially a half of the circumferential surface of the die wheel, this primary-primary-intermediate surface fastener is positively cooled by the cooling water jacket mounted in the die wheel and at the same time, is moved in and through the cooling water bath, in which low-temperature cooling water circulates, and is thereby quickly cooled to facilitate solidification. Since the primary-intermediate molded surface fastener is solidified by this quick cooling before crystallization of the molded surface fastener starts, it is possible to make the whole substrate sheet and all of the engaging elements adequately soft. Accordingly the molded surface fastener is more suitable for use in a fastener for underwear, paper diaper, which require an adequate degree of softness.

When the solidified substrate sheet is separated from the circumferential surface of the die wheel by a pair of take-up rollers, the individual cooled and solidified engaging elements are drawn successively from the engaging-element-forming cavities smoothly as they resiliently deform into a straight shape. At that time, each of the engaging elements does not perfectly restore to its original shape, assuming a hook-shape posture in which the engaging head slightly rises as compared to the engaging-head-forming cavity.

Especially, if the engaging heads extend in forward and reverse directions with respect to the direction of rotation of the die wheel, the forward engaging head assumes a stand-up posture higher than the reverse engaging head due to the difference of drawing direction. Regarding the posture keeping the shape of the engaging element when the it is drawn off the die wheel before the top is processed with the subsequent heating and pressing process, the difference of bending angles of the forward and reverse engaging heads with respect to the stem is reflected directly in the difference of peeling strength. But after the heating and pressing process, the difference of bending angle would be small, while the peeling strength of the forward engaging head would be particularly increased as compared to the reverse engaging head.

Namely, the generally inverted L-shape engaging element in which the forward engaging head is deformed more increases considerably in peeling strength after the protuberances have been formed, as compared to the engaging element in which the reverse engaging head is deformed less in bending angle. With this physical property change in view, if the bending angle of the reverse-engaging-head-forming cavity in the circumferential surface of the die wheel is previously set to be larger than that of the forward-engaging-head-forming cavity, it is possible to secure substantially the same peeling strength for either the engaging element having the forward engaging head or the engaging element having the reverse engaging head.

When a difference in bending angle between the forward-engaging-head-forming cavity and the reverse-engaging-head-forming cavity is to be previously given, the bending angle of the forward-engaging-head-forming cavity is set smaller than that of the reverse-engaging-head-forming cavity so that the forward and reverse engaging heads drawn from the die wheel assume substantially the same angle of inclination with respect to the substrate sheet. Preferably, the bending angle of the forward-engaging-head-forming cavity is −5°~80°, while the bending angle of the reverse-engaging-head-forming cavity is 10°~90°.

In order not to give a difference in shape between the forward and reverse engaging heads after the heating and pressing process, it is also preferable to give a difference in length from the opening at the circumferential surface of the die wheel to a bending start point of the engaging head-forming cavity with respect to the radially extending stem-forming cavities between the forward- and reverse-engaging-head-forming cavities, in addition to the setting of the above-mentioned bending angles. The ratio of the distance between the opening of the stem-forming cavity at the circumferential surface of the die wheel and the bending start point of the engaging-head-forming cavity extending in the direction of rotation of the die wheel from the stem-forming cavity, and the distance between the opening of the stem-forming cavity at the circumferential surface of the die wheel and the bending starting point of the engaging-head-form cavity extending reversely with respect to the direction of rotation of the die wheel from the stem-forming cavity is preferably about 1:1.01~1:1.50, more preferably 1:1.15.

After its opposite side edges have been cut off by a trimming unit, the thus primary-intermediate surface fastener is moved through and between the upper and lower rollers serving as the beating and pressing means. During that time the top of the engaging head is heated and pressed by the upper heating roller, which deforms the top of the engaging head to bend the engaging head slightly toward the downstream side from its top to its distal end and to form a substantially flat top surf ace and a pair of transverse protuberances bulging in opposite directions from opposite sides of the flat top surface. As a result, the molded surface fastener having on the substrate sheet a multiplicity of engaging elements of the above-mentioned shape is obtained.

The molded surface fastener passed through th e heating and pressing means is slowly cooled at normal, ambient temperature, without being positively cooled by independent cooling means, whereupon the cooled surface fastener is wound up in a roll to finalize the manufacturing. When the heated and deformed top of the engaging head is slowly cooled to become solidified, crystallization in the heated portion proceeds so that the engaging head would increase in rigidness as compared to the stem. Specifically, since the engaging heads have an increased degree of rigidness as compared to the substrate sheet and the engaging elements, which are quickly cooled to retard crystallization and hence to become excellent in softness, it is possible to secure adequate rigidity of the engaging heads, even though the engaging elements are minute in size and very high in softness, thus guaranteeing a required degree of strength in the peeling direction, even with a single-head--structure engaging element.

DETAILED DESCRIPTION OF THE PREFERRED EMBODIMENTS

Figure 1:
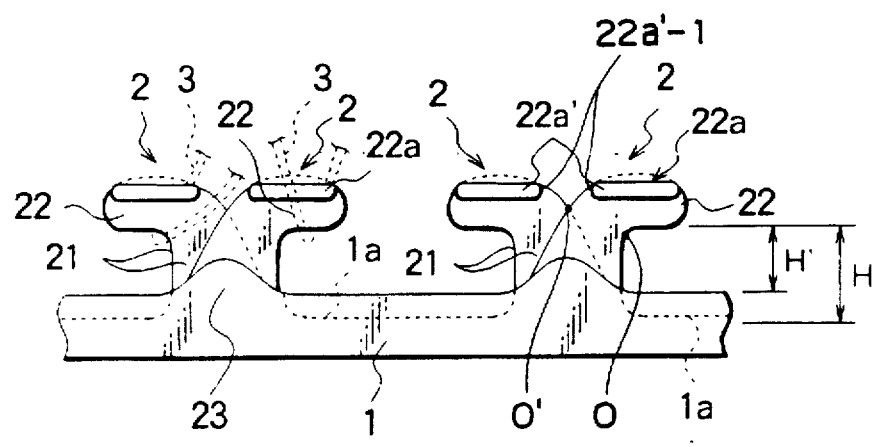
FIG. 1 is a fragmentary side view of a molded surface fastener according to a first structural example of this invention.

Preferred embodiments of this invention will now be described in detail with reference to the accompanying drawings. FIG. 1 is a fragmentary side view of a molded surface fastener having a first structural example of engaging elements, which is a typical one of this invention, FIG. 2 is a plan view of the molded surface fastener of the first structural example, and FIG. 3 is a front view of the molded surface fastener of the first structural example.

Figure 2:
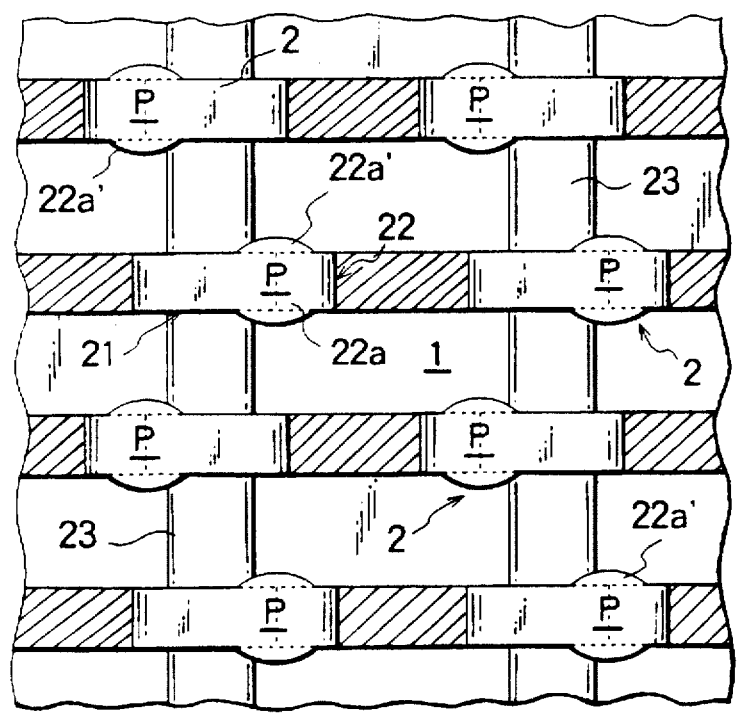
FIG. 2 is a plan view of the molded surface fastener of the first structural example.
Figure 3:
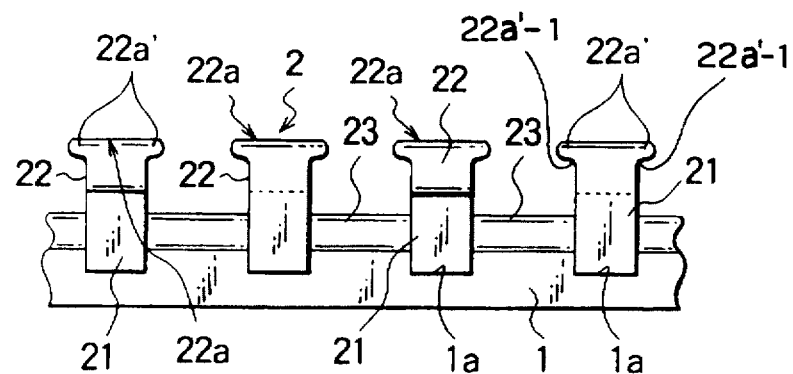
FIG. 3 is a front view of the molded surface fastener of the first structural example.

As shown in FIGS. 1 through 3, the molded surface fastener comprises a substrate sheet 1, and a multiplicity of inverted L-shape engaging elements 2 standing on a front surface of the substrate sheet 1. In the illustrated example, engaging heads 22 of the engaging elements 2 in the same row extend in the same direction, while engaging heads 22 of the engaging elements 2 in each adjacent pair of rows extend in opposite directions. The individual engaging elements 2 of every row are identical in structure, and the substrate sheet 1 has the same structure at each and every row of the engaging elements 2; therefore the following description of the surface fastener SF is limited to its partial structure.

The substrate sheet 1 has in the front surface a predetermined number of continuous straight recesses 1a, from bottom surfaces of which a multiplicity of the engaging elements 2 stand at a predetermined pitch with their engaging head 22 extending in the same direction. Each of the engaging elements 2 has a stem 21 standing from the bottom surface of each recess 1a and the engaging head 22 bending and standing from an upper end of the stem 21 in an engaging-element-row direction. Further, according to the illustrated example, the engaging heads 22 in each adjacent pair of rows of the engaging elements 2 extend in opposite directions. The recess 1a is not limited to the aforementioned shape, but alternatively, the recesses 1a along each engaging element row may be disposed perfectly independently of one another. In another alternative form, the individual recess sections 1a along each adjacent pair of engaging element rows may be arranged in a staggering pattern on the front surface of the substrate sheet 1; in such case, if a reinforcing rib 23 (described later) projecting, from the front surface of the substrate sheet 1, on one side of an intermediate portion between each pair of front and rear engaging elements 2 in one row is omitted, in spite of improving the softness of the substrate sheet, it is possible to secure a predetermined degree of tearing strength.

In the surface fastener SF of this embodiment having such a basic structure, though the distance H between the lower surface of the distal end of the engaging head 22 and the base end (bottom surface of the recess 1a) of the stem 21 is the same as conventional, the distance H' between the lower surface of the distal end of the engaging head 22 and the recessfree area of the front surface of the substrate sheet 1 is equal to the difference between the distance H, which is related to the actual height of the engaging element 2, and the depth of the recess 1a. This means that though the actual height H of the engaging element 2 standing on the substrate sheet 1 is the same as conventional, the apparent height H' of the engaging element 2 above the front surface of the substrate sheet 1 is shorter than the actual height H by the depth of the recess 1a. Having these recesses 1a in its front surface, the substrate sheet 1 can be improved remarkably in softness though its apparent thickness is the same as convention. Also this substrate sheet 1 can be kept from excessive expansion or ripping when the surface fastener SF is peeled off the die after molding. As a result, a high quality product free of puckering in the substrate sheet 1 and adequately durable for practical use can be obtained.

Further, when the engaging element 2 of the surface fastener SF of this embodiment having the aforementioned structure engages the companion loop 3, the distal end of the loop 3 comes under the engaging head 22 as guided by the recess 1a to reach the base end of the stem 21 of the engaging element 2 so that the engaging head 22 is inserted through the loop 3 smoothly.

Regarding the parameters of the illustrated example, the depth of the individual recesses 1a of the substrate sheet 1 is about 0.05 mm, and its width is equal to that of the stem 21. Accordingly, the base end of the engaging element 2 is disposed on the bottom surface of the individual recess 1a, and the upper portion of the engaging element 2 from a point, 0.05 mm high, of the stem 21 to the top 22a of the engaging head 22 projects above the front surface of the substrate sheet 1.

In this embodiment, the actual height H of the engaging element 2 above the bottom surface of the recess 1a is about 0.35 mm, while the apparent height H' of the engaging element 2 above the front surface of the substrate sheet 1 is 0.30 mm. The width of the stem 21 in a direction perpendicular to the engaging element row is 0.15 mm equal to the width of the engaging head 22 in the same direction. Further, the thickness of the substrate sheet is 0.30. mm, and on the front surface of the substrate sheet 1, the engaging elements 2 are arranged at a pitch of 0.8 mm along each engaging element row and are spaced a distance of 0.45 mm from those of adjacent engaging element rows. These values, which are shown only as an optimum example, should by no means be limited to the illustrated example and may be changed variously as desired in relation to the companion loops.

As a characteristic feature of the engaging element 2 according to this invention, a whole top 22a of the engaging head 22 defines a substantially oval flat surface having a pair of protuberances 22a' horizontally bulging in opposite directions from opposite sides of the engaging head 22, as viewed from the upper side in FIG. 2. A longer diameter of the oval extends longitudinally of the engaging head 22, while a shorter diameter extends transversely of the engaging head 22. In this embodiment, the length of each of the protuberances 22a' is about 0.10 mm, and the total width of the top 22a of the engaging head 22 in a direction transverse of the engaging element row is 0.25, which is 0.05 mm larger than the width of either the remaining part of the engaging head 22 or the stem 21. The presence of the protuberances 22a' displays the following various useful functions, which could not be expected from the conventional engaging heads.

Figure 4A:
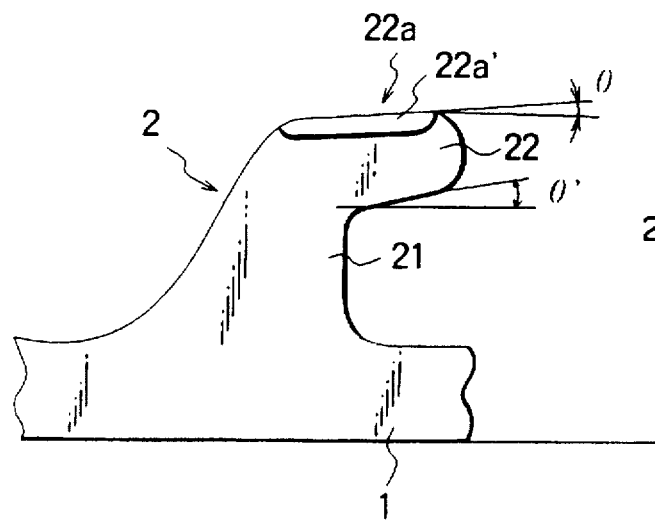
FIGS. 4A and 4B are fragmentary side and front views of a modification of the molded surface fastener of the first structural example.
Figure 4B:
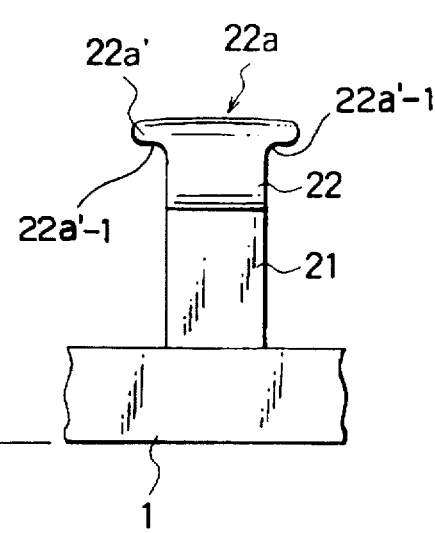

For a first function, it is possible to define a substantially flat surface on the top 22a of the engaging head 22, giving a less itchy touch, or smoother hand to the surface fastener. For a second function, assuming that the quantity of resin for the top 22a a of the engaging head 22 including the protuberances 22a' is the same as conventional, it is possible to make the apparent height of the engaging head 22 from the front surface of the substrate sheet 1 to a top point thereof relatively shorter without changing the height of the engaging head 22 above the front surface of the substrate sheet 1. Therefore, it is possible not only to make the engaging elements 2 minute but also to leave the front surface of the substrate sheet 1 merely flat, as shown in FIGS. 4A and 4B, without forming any recesses of FIGS. 1 through 3.

For a third function, these protuberances 22a' has, not only the function of merely engaging loops with the conventional engaging head having a substantially uniform size, but a function that the individual loop 3 of the companion surface fastener can be caught with rear ends 22a'-1 of the protuberances 22a' so as not to be easily removed off the engaging head 22, thus increasing the engaging strength sharply. Since these protuberances 22a', unlike the conventional mushroom-type engaging element having an umbrella-shape engaging head extending in all directions from the upper end of the stem 21, exist only on a part of the engaging head 22 extending in one direction of the stem 21, and allow the loop 3 to smoothly move around the protuberances 22a', though the loop 3 is caught by the rear ends 22a'-1 of the opposite protuberances 22a' of the engaging head 22 extending substantially in a straight line as mentioned above, as the engaging head 22 resiliently deforms to stand up when a peeling force is exerted on the surface fastener, thus achieving smooth separation. So, the separation can be achieved by a separating force greater than that with the conventional ordinary hook-shape engaging head and smaller than that with the conventional umbrella-shape engaging head. As a result, it is possible to secure a required degree of engaging strength, in spite of the minute size of the engaging heads 22, without causing any damage to either the engaging elements 2 or the loops 3, in spite of such a minute size.

Further, in the presence of the protuberances 22a', it is possible to modify the shape of the engaging head 22. Namely, since the protuberances 22a' cause an increased degree of engaging strength with the loops as mentioned above, it is possible to bend the whole engaging element 2 into a generally inverted L shape with the engaging head 22 extending substantially straightway without curving downwardly toward the substrate sheet 1 like the conventional hook-shape engaging head. This facilitates inserting the engaging head 22 into the companion loop, which is even of a minute size, such as short and minute single-fiber pile bristling as part of an ordinary non-woven cloth.

Of course, this invention includes other shapes, the entire shape of the engaging head 22, which is closely akin to the ordinary shape having the curved shape in which the distal end is slightly curved toward the front surface of the substrate sheet. However, for the minute-size and single-fiber pile, in the case that the vertical thickness of the engaging head 22 is uniform, it is preferable that the shape of the top of each engaging head 22 extends straightly and that the engaging head 22 is inclined with respect to a plane parallel to the front surface of the substrate sheet 1, i.e. the horizontal plane, by an angle θ of −5°~+45°, preferably by an angle θ of +10°~+30°. Further, the lower surface of the engaging head 22 is inclined by an angle θ' of 0°~+60° with respect to the front surface of the substrate sheet 1 in order to facilitate insertion of the engaging head 22 into the minute-size and single-fiber pile. Even with such a structure, it is impossible to obtain an adequate engaging strength with respect to the companion loops 3. With the conventional J-shape or mere inverted L-shape engaging head, as long as it is a single head, such an adequate engaging strength could not be expected, which is apparent from, for example, Japanese Patent Laid-Open Publication No. Hei 2-5847 (U.S. Pat. No. 4,884,060).

Also preferably, the stem 21 has on its opposite side surfaces a pair of reinforcing ribs 23 rising from the front surface of the substrate sheet 1, forming a line perpendicular to the direction of the engaging element rows. Each of the reinforcing ribs 23 connects side surfaces of the stems 21 of an adjacent pair of the engaging elements 2. Of course, each reinforcing rib 23 may project from the side surface of the stem of each engaging element 2 independently of one another. Further, the shape of the reinforcing rib 23, its height above the front surface of the substrate sheet 1, and its width in the direction of the engaging element row may be set as desired. For example, if at least one of the front and rear surfaces of the stem 21 is inclined with respect to the vertical plane, the reinforcing rib 23 may rise beyond the inclined surface in parallel to the center line of the stem 2 and terminates in an apex substantially equal in height to the uppermost point of the engaging head 22 or short of the uppermost point of the engaging head 22 along an axis of the engaging element 2. The reinforcing ribs 23 serve to assist in increasing the rigidity of especially the minute-size stem 21. Further, if each adjacent pair of engaging elements 2 of each engaging element row are connected by the reinforcing rib 23 as in this embodiment, it is possible to effectively prevent the substrate sheet 1 from being torn either longitudinally or transversely of the engaging element rows.

Figure 5:
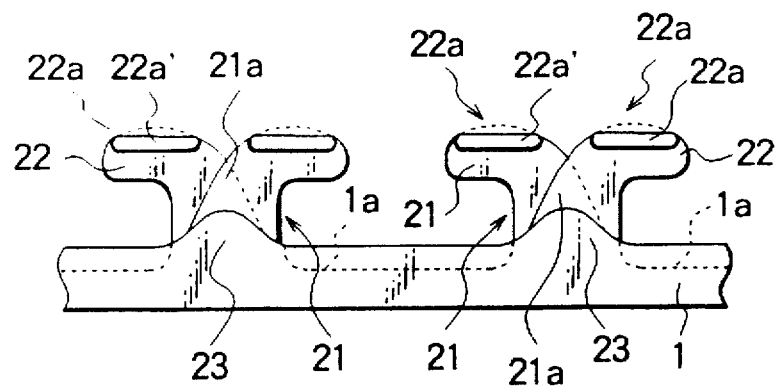
FIG. 5 is a fragmentary side view of a molded surface fastener according to a second structural example of the invention.
Figure 6:
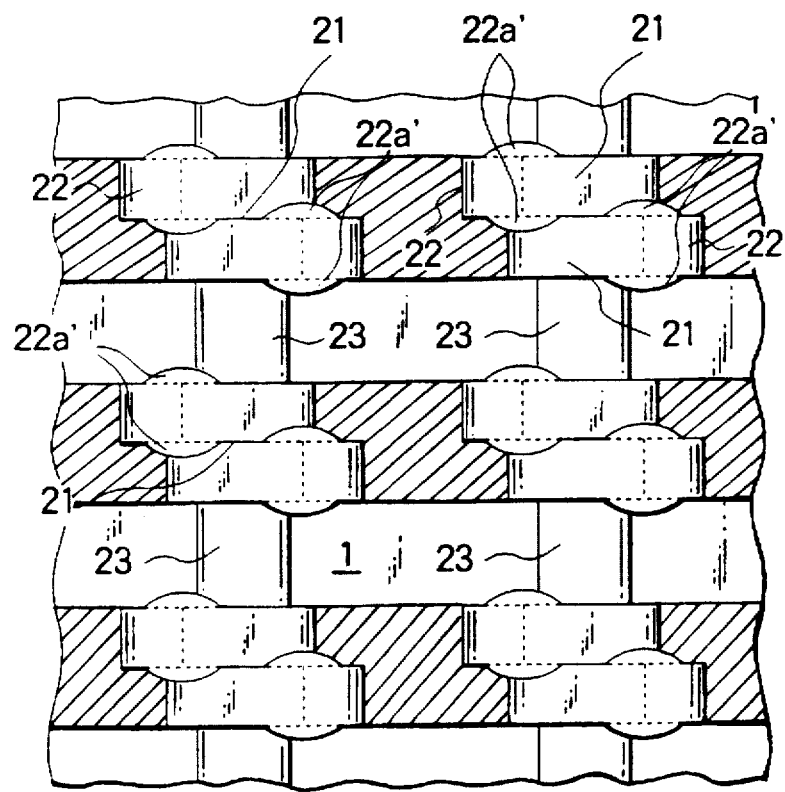
FIG. 6 is a plan view of the molded surface fastener of the second structural example.
Figure 7:
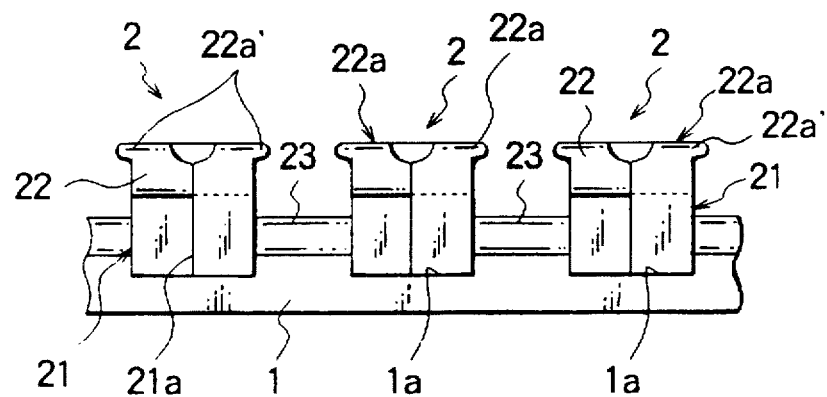
FIG. 7 is a front view of the molded surface fastener of the second structural example.

FIGS. 5 through 7 shows modified engaging elements 2 according to a second structural example of this invention. According to the second structural example, each mutually oppositely directed pair of engaging elements 2 in an adjacent pair of engaging element rows in the first embodiment are joined together at their confronting side surfaces in a composite or double-head structure. This composite engaging element 2 has two engaging heads 22 on a single stem 21. In this double-head structure, the two straightly extending engaging heads 22, each having the same shape as that of the first embodiment, are branched in opposite directions from the upper end of the single stem 21 along of the engaging element rows by dividing the upper end of the stem 21 transversely of the engaging element rows.

Accordingly, in this embodiment, if the same quantity of resin as in the first embodiment is used for the engaging elements 2, the two engaging heads 22 each having a common width of that of the first embodiment project in opposite directions from the upper end of the single stem 21 and extend in two parallel vertical planes. Therefore, with the double-head structure, it was discovered that it is possible to increase the density of the engaging heads 22 substantially double as compared to the first embodiment, without increasing the density of the engaging elements 2, so that the rate of engagement with the companion loops 3 also would necessarily increase.

Further, in this case, each composite engaging element 2 includes a large-width portion 21a rising from the base of the stem 21 continuously to each engaging head 22 and having a double thickness as compared to the engaging head 22. This means that if the quantity of resin for each subdivided engaging head 22 is equal to the resin quantity for the single engaging head 22 of the first embodiment, i.e. each of the sub-divided engaging heads 22 have an identical shape with the same parameters as that shown in FIGS. 1 through 3, a double quantity of resin is used for part of the stem 21 as compared to the single engaging head 22 of the first embodiment, thus causing an increased degree of rigidity of the large-width portion 21a of the stem 21. Further, if the double-head engaging element 2 of this embodiment has a pair of reinforcing ribs 23 integrally formed on opposite side surfaces of the stem 21, it is possible to reduce the rate of falling flat of the engaging elements 2 remarkably to thereby realize reliable engagement with and separation from the companion loops 3.

Figure 8A:
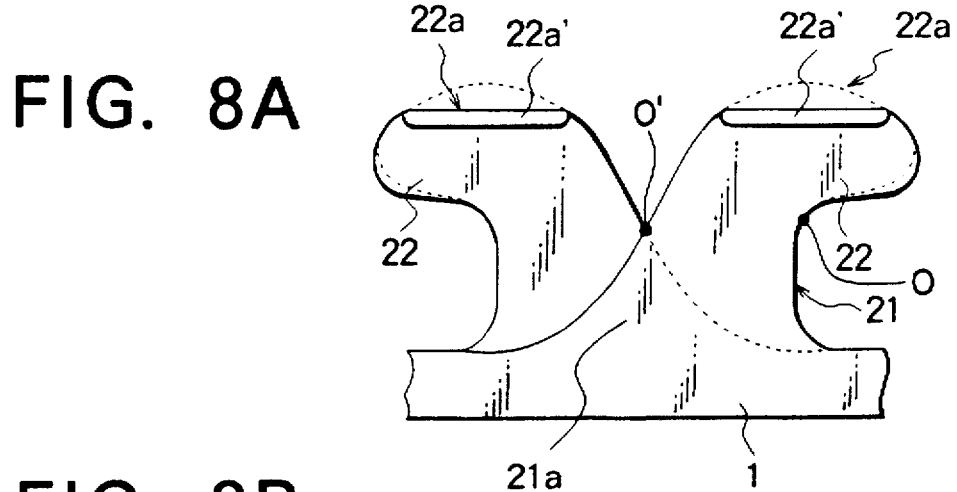
FIGS. 8A and 8B are fragmentary side and front views of a modification of the molded surface fastener of the second structural example.
Figure 8B:
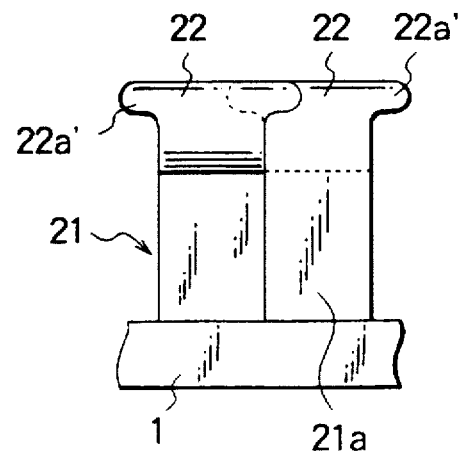

In the second structural example of the engaging element 2 shown in FIGS. 5 through 7, the diverging point of the two engaging heads 22, which can be shown from a side of the engaging element 2, is disposed at a level higher than the lower surface of the engaging head 22. The height of the diverging point may be set as desired; for example, the two engaging heads 22 may be branched halfway of the stem 21 as shown in FIG. 8A and 8B at a position lower than the lower surface of the engaging head 22.

Figure 9:
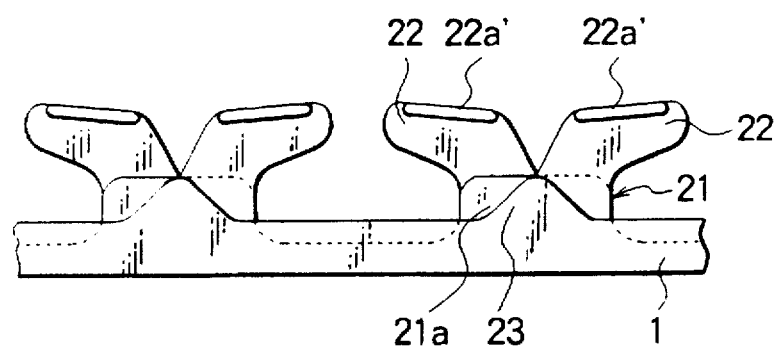
FIG. 9 is a side view of another modification of the molded surface fastener of the second structural example.
Figure 10:
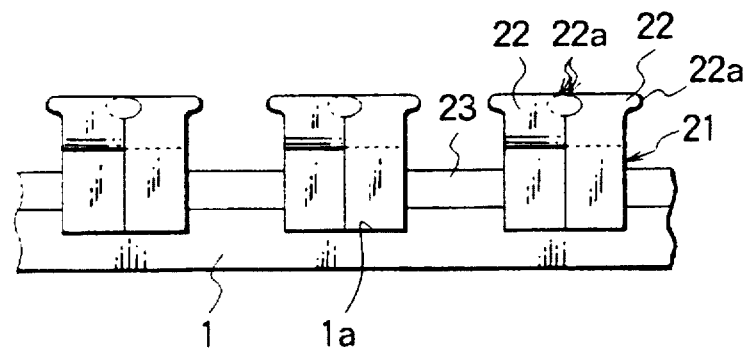
FIG. 10 is a front view of the last-mentioned modified molded surface fastener of the second structural example.

FIGS. 9 and 10 show a modification of the double-head engaging element 2 of the second structural example. This modification is differentiated from the second structural example by a generally trapezoidal large-thickness portion 21a spanning over the entire width and rising from the front surface of the substrate sheet 1 to the diverging point of the two engaging heads 22. With this trapezoidal large-thickness portion, it is possible to secure an increased degree of rigidity at the base or lower portion of the stem 21, without impairing the softness at the upper portion of the stem 21, so that the base portion of the stem 21 can be kept free from easy bending, thus securing adequate rate of engagement with the companion loops 3.

Though there is no illustration in the drawings, a pair of engaging heads 22 each having a width equal to the width of the single stem 22 may extend in opposite directions in a common vertical plane, as long as the single stem 21 has adequate rigidity even by itself.

The molded surface fastener SF of this invention having such a structure may be manufactured either batchwise using the ordinary injection molding machine or may be continuously using the apparatus disclosed in, for example, U.S. Pat. Nos. 4,984,339 and 5,441,687.

Figure 11:
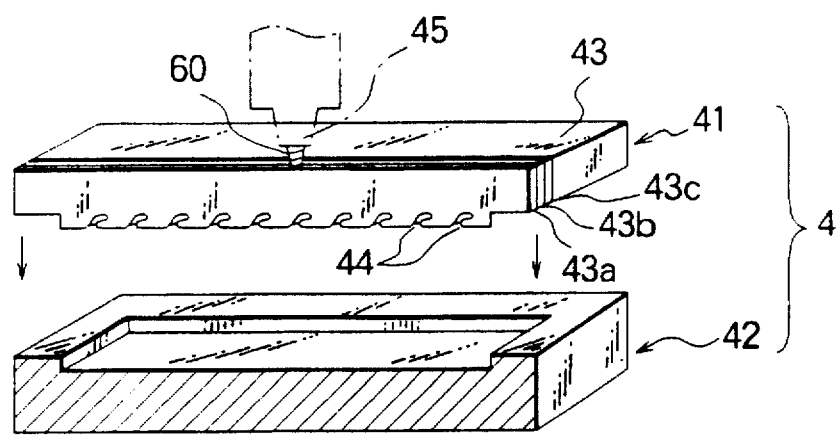
FIG. 11 is a perspective view, partly in cross section, of an injection molding die for use in manufacturing the molded surface fastener.
Figure 12:
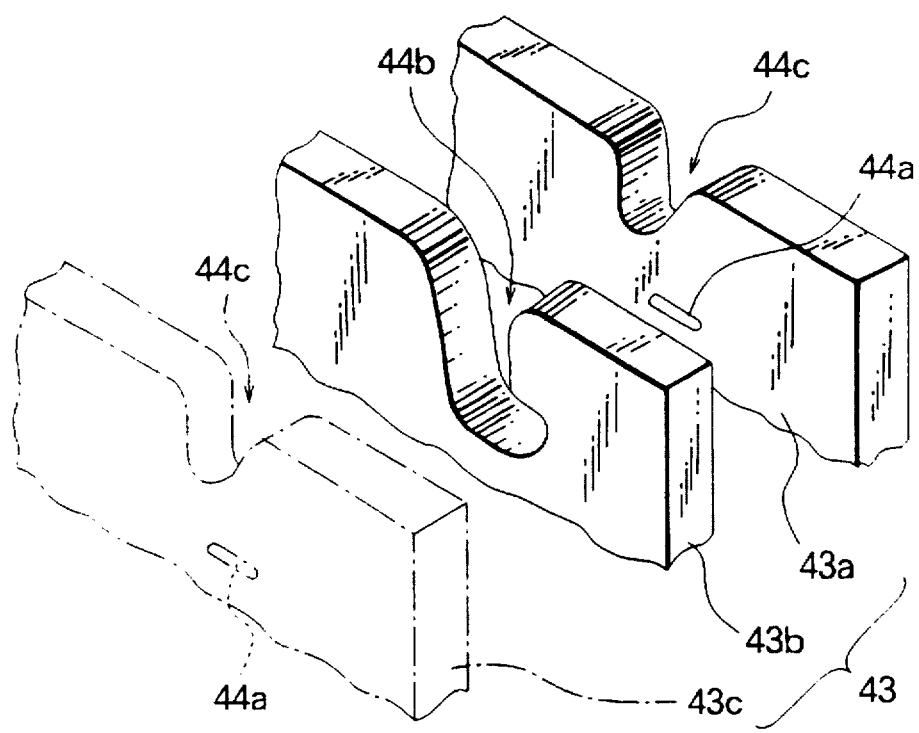
FIG. 12 is a fragmentary exploded perspective view showing, on an enlarged scale, an example of internal shape of an engaging-element-forming cavity.

FIG. 11 schematically shows an injection molding die for the surface fastener SF, and FIG. 12 shows, on an enlarged scale, an example of an internal shape of the molding cavity for the individual engaging element. The remaining parts of the injection molding machine are identical with those of the same-type conventional injection molding machine, so the following description is limited to the molding die and the engaging-element-forming cavities.

In FIG. 11, reference numeral 4 designates an injection molding mold composed of a movable die part 41 and a fixed die 42. When the molding mold 4, is closed, the peripheral parting surface of the movable die part 4 is brought into contact with the peripheral parting surface of the fixed die 42 and, at the same time, an engaging-element-forming pattern 43 of the movable die 41 is placed into the fixed die part 42 to define a substrate-sheet-forming gap between a flat cavity surface of the fixed die 42 and the engaging-element-forming pattern 43 of the movable die 41. The engaging-element-forming pattern 43 is composed of a number of different plates 43a–43c, which are placed in close contact one over another to define a multiplicity of engaging-element-forming cavities 44. With the plates 43a–43c placed in close contact with one another, the movable die 41 is moved toward and away from the fixed die 42 to close and open the mold 4; when the die 4 is opened, the individual plates 43a–43c are separable from one another.

Figure 13:
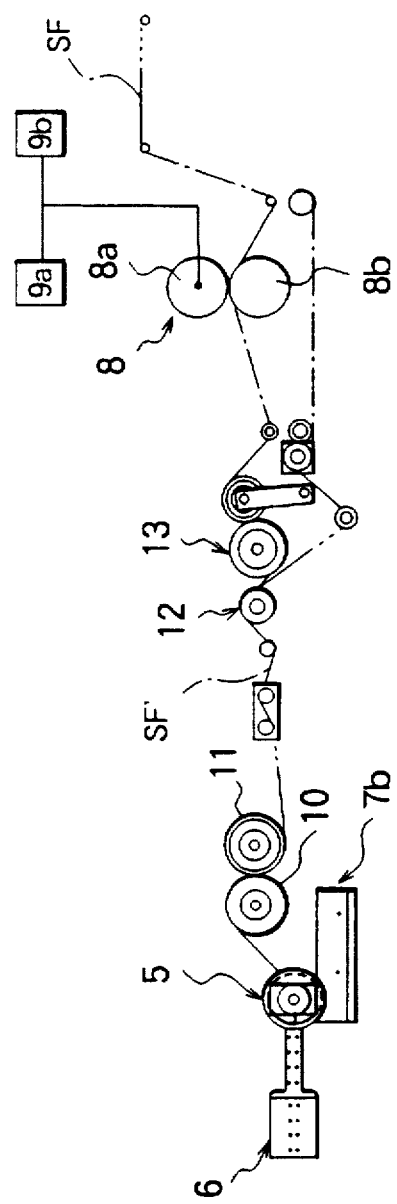
FIG. 13 is a general view showing a schematic structure of an apparatus for continuously manufacturing the molded surface fastener using an injection nozzle.
Figure 14:
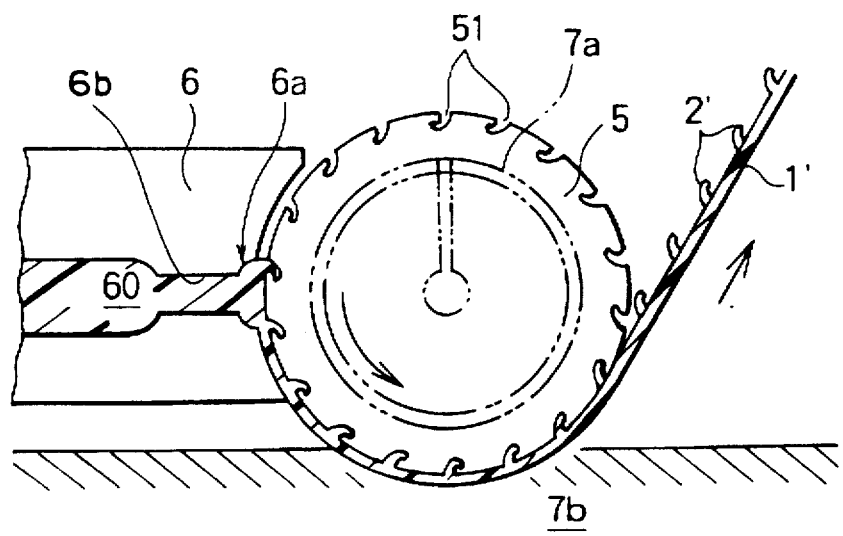
FIG. 14 is an enlarged cross-sectional view schematically showing a primary-intermediate surface fastener molding station of the apparatus.
Figure 15:
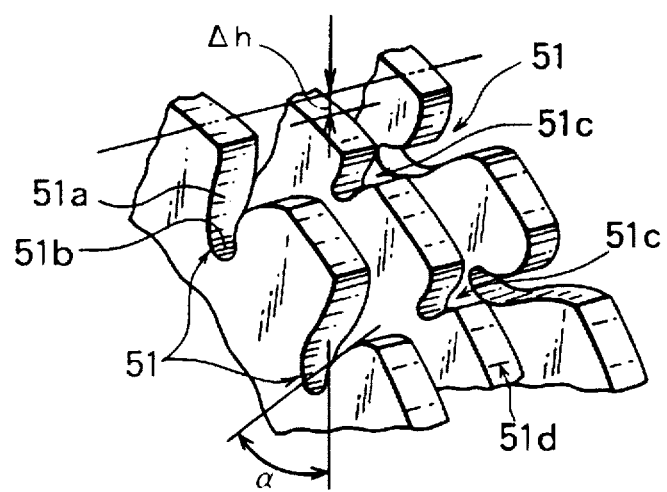
FIG. 15 is an exploded perspective view showing an example of cavities of a die wheel used in the apparatus.

Of the plates 43a–43c, the central plate 43b has a multiplicity of engaging-element-forming cavities 44b each for forming the stem 21 and the engaging head 22 of the engaging element 2, while each of adjacent two plates 43a, 43c has a protuberance-forming cavity 44a' for forming a respective one of the two protuberances 22a' forming a part of the top 22a of the engaging head 22, and a reinforcing-rib-forming cavity 44c for forming a respective one of the two reinforcing rib 23. According to the illustrated example, the protuberance-forming cavity 44a is a recess whose contour is a half of an oval divided into halves along the long diameter. When these three plates 43a–43c are placed in close contact one over another, a multiplicity of engaging-element-forming cavities 44 are defined in the engaging-element-forming pattern 43 of the movable die part 41, whereupon molten resin 60 is injected into the cavities 44 from an injection nozzle 45. Thus a molded surface fastener SF having a multiplicity of engaging elements 2 on a substrate sheet 1 as shown in FIGS. 4A and 4B if molded FIG. 13 schematically shows an general structure of an apparatus for continuously molding the surface fastener SF of this invention, and FIG. 14 shows, on an enlarged scale, a molding station of the apparatus. In FIGS. 13 and 14, reference numeral 6 is an injection nozzle, whose tip has an arcuate surface complementing the circumferential surface of a die wheel 5 (described later), for continuously injecting molten resin from an orifice 6a. The injection nozzle 6 is a T-type die disposed in a confronting relation to the circumferential surface of the die wheel 5 with a gap corresponding to the thickness of the substrate sheet 1, and a constant quantity of molten resin 60 is continuously injected in a sheet form from the orifice 6a at a predetermined resin pressure. In this embodiment, the injection nozzle 6 has a single central sprue 6b. The molten synthetic resin 60 is exemplified by polypropylene, low-density polyethylene (LDDE), polyester elastomer, or nylon.

A circumferential surface of the die wheel 5 serves as a molding surface for molding the surface fastener SF. As described above, the gap is provided between the top arcuate surface of the injection nozzle 6 and the die wheel 5 with the axis of the die wheel 5 being parallel to the orifice 6a. The die wheel 5 is a hollow drum having a water-cooling jacket 7a inside and composed of a multiplicity of non-illustrated ring-shape plates fixedly placed one over another along its axis in a laminate form, as shown in FIG. 14.

In this embodiment, as shown in FIG. 14, the die wheal 5 has a multiplicity of engaging-element-forming elements 51 in rows extending around its circumferential surface and spaced at a predetermined pitch in a direction parallel to the axis of rotation of the die wheel 5. Between each adjacent pair of rows of engaging-element-forming cavities 51, there is a ring-shape recess 51d forming around the circumferential surface of the die wheel 5 and having a depth of Dh and a multiplicity of generally triangular reinforcing-rib-forming cavities 51c having a depth larger than that of the recess 51d and arranged in alignment of the engaging-element-forming cavities 51c in a direction parallel to the axis of rotation of the die wheel 5. The ring-shape recess 51d defines a cavity for forming part of the front surface of the substrate sheet 1.

Each of the engaging-element-forming cavities 51 is composed of a stem-forming cavity 51a extending from the circumferential surface of the die wheel 5, an engaging head-forming cavity 51b extending straightly from an end of the stem-forming cavity 51a and inclined by an angle 85° with respect to the stem-forming cavity 51a.

The die wheel 5 having such a structure is driven by a non-illustrated known drive unit for rotation in the direction of an arrow shown in FIG. 14. The bending angle of the engaging-head-forming cavity 51b with respect to the stem-forming cavity 51a is determined with estimation of the deformation of the engaging head 22 when the top 22a of the engaging head 22 is heated and depressed from the upper side by heating and pressing means 8 (described later).

Also in this embodiment, a substantially lower part of the die wheel 5 is dipped in a cooling water bath 7b disposed under the die wheel 5. A pair of take-up rollers 10, 11 are disposed downstream and diagonally upwardly of the cooling water bath 7b. A trimming unit 12 also is disposed further downstream of the take-up rollers 10, 11 for cutting edges of a primary-intermediate molded surface fastener SF', which is the blank of a final-product molded surface fastener SF. Further downstream of the trimming unit 12, a vertical pair of heating and pressing rollers 8a, 8b constituting a heating and pressing means, which is the most characteristic part of this invention, for forming the protuberances 23a' of the engaging head 22. Disposed at a position between the trimming unit 12 and the heating and pressing rollers 8a, 8b, is a tension control unit 13 for adjusting the tension of the primary-intermediate molded surface fastener SF'.

Figure 16:
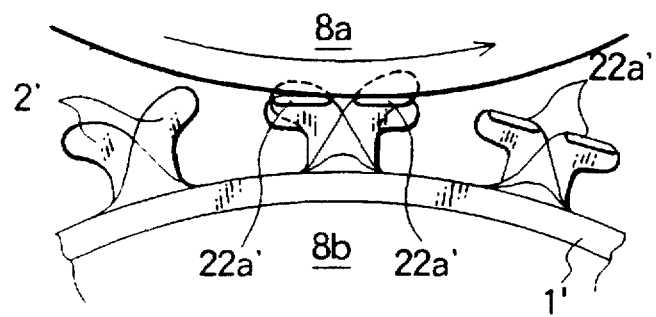
FIG. 16 shows the manner in which an engaging head is processed by heating and pressing means, which is a characterizing part of this invention.

Inside the upper roller 8a, a non-illustrated heating source is disposed so that the surface temperature of the roller 8a is set at a resin softening temperature. Further, the lower end of the circumferential surface of the upper roller 8a is disposed at a Level slightly below a horizontal plane passing the engaging head 22' of the primary-intermediate molded surface fastener SF', as shown in FIG. 16 on a large scale. The setup position of the upper roller 8a is determined according to a desired size of the protuberances 22a' bulging from the top 22a of the engaging head 22 of the engaging element 2 according to the invention. On the other hand, the upper surface of the lower roller 8b is disposed in a horizontal plane in which the rear surface of the substrate sheet 1 of the primary-intermediate surface fastener SF' travels. In this case, as shown in FIG. 13, the vertical position of the upper roller 8a can be adjusted by a known roller-level adjuster 9a (FIG. 13), and the heating temperature of the upper roller 8a can be adjusted as desired according to the kind of the resin by a known temperature control unit 9b (FIG. 13). Although both the upper and lower rollers 8a, 8b may be positively driven for rotation in synchronism with each other, at least the upper roller 8a is operatively connected to a drive source such as a non-illustrated electric motor for rotation. The lower roller 8b may be substituted by a table having a less frictional flat top surface.

The experiments conducted under the direction of the present inventors show that when the individual cooled and solidified engaging elements 2 are drawn successively off the generally inverted L-shape engaging-element-forming cavities 51, in which the individual engaging head-forming cavities 51a extend from the corresponding stem-forming cavities 51b in a direction of the rotation of the die wheel 5 or in its reverse direction, degrees of deformation of the engaging elements 2 drawn from the cavities 51 having the direction of the die wheel's rotation and drawn from those having the reverse direction are different to a large extent.

Figure 17A:
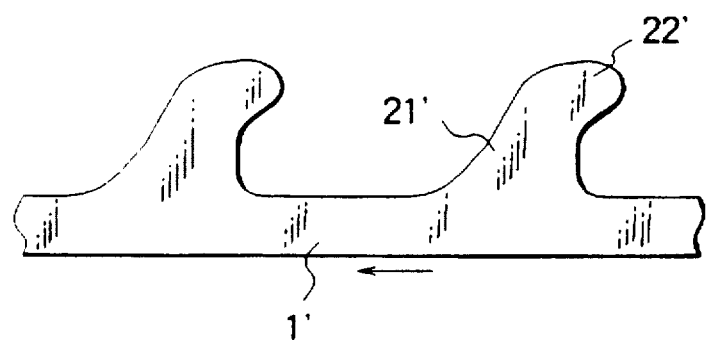
FIGS. 17A and 17B are fragmentary side views showing the respective shapes of examples of forward and reverse engaging elements, before the heating and pressing process, which have a forward engaging head extending in the direction of rotation of the die wheel and a reverse engaging head extending reversely with respect to the direction of rotation of the die wheel.
Figure 17B:
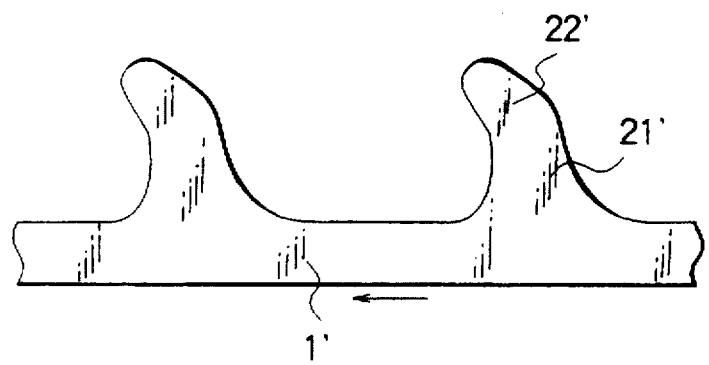

FIG. 17 A and 17B shown the differential of the degrees of deformation, in which the arrows indicates the rotating direction of the die wheel 5. As shown in FIGS. 17A and 17B, the engaging head 22' extending in the rotating direction of the die wheel 5 (hereinafter called the forward engaging head ) assumes a stand-up posture higher than the engaging head 22' extending in the reverse direction of rotation of the die wheel 5 (hereinafter called the reverse engaging head), and does not restore its original shape enough after having been drawn from the cavity 51, so that the degree of its bending with respect to the stem 21' is too little and its bending angle is necessarily large. Consequently, in order to match the bending angle of the forward engaging head 22' with that of the reverse engaging head 22', it is necessary to previously set the bending angle of the forward engaging-element-forming cavity 51 different from that of the reverse engaging-element-forming cavity 51 in the circumferential surface of the die wheel 5.

For molding the surface fastener SF of this invention by the apparatus for manufacturing a surface fastener having the above-mentioned structure, molten resin 60 is continuously injected from the injection nozzle 6 into the gap, which is defined between the rotating die wheel 5 and the orifice 6a, under a predetermined resin pressure, part of the molten resin 60 fills the gap to mold the substrate sheet 1' and, at the same time, the remaining part of the molten resin 60 fills successively the engaging-element-forming cavities 51, which are formed in the circumferential surface of the die wheel 5, to mold a multiplicity engaging element blanks 2' integrally on the front surface of the substrate sheet 1' along the rotation of the die wheel 5. Thus the primary-intermediate molded surface fastener SF' is continuously molded.

While the primary-intermediate molded surface fastener SF', which is the blank of the surface fastener SF of the invention, is moved along a substantially half part of the circumferential surface of the die wheel 5, this primary-intermediate surface fastener SF' is positively cooled by the cooling water jacket 7a mounted in the die wheel 5 and, at the same time, the primary-intermediate surface fastener SF' is moved in and through the cooling water bath 7b, in which low-temperature (about 15° C.) cooling water circulates, and is thereby quickly cooled to facilitate solidification. Since the primary-intermediate molded surface fastener SF' is solidified by this quick cooling before crystallization of the molded surface fastener SF' starts, it is possible to make the whole substrate sheet 1 and all of the engaging elements 2 adequately soft.

When the solidified substrate sheet 1' is separated from the circumferential surface of the die wheel 5 by the takeup rollers 10, 11, the individual cooled and solidified engaging elements 2' are drawn successively off the engaging element-forming cavities 51 smoothly as they resiliently deform into a straight shape. At that time, the engaging elements 2' tend to restore to the original shape but do completely, and an individual engaging head 22' has such a shape that the engaging head 22' stands from at a bending angle slightly upwardly compared to the invented L-shape of the engaging element-forming cavities 51 .

In this embodiment, the primary-intermediate surface fastener SF' is separated off the die wheel 5 using the upper and lower take-up rollers 10, 11 rotating in opposite directions in synchronism with each other. Although the circumferential surfaces of the take-up rollers 10, 11 may be smooth, it is preferable to provide each of them with a ring-shape groove on a circumferential portion thereof where the engaging element row processes so as not to damage the engaging elements 2. The primary-intermediate molded surface fastener SF' is moved through the trimming unit 12, in which opposite side edges of the molded surface fastener .SF' are cut off, and then through and between the upper and lower rollers 8a, 8b constituting a heating and pressing means 8. While traveling through the heating and pressing means 8, the top portion of the engaging heads 22' of the engaging element 2' are heated and pressed by the upper heating roller 8a so that the individual engaging head 22' is inclined slightly forwardly from its base end and to its, distal ends, as indicated by the solid line in the claming at the same time, deforms as softened from its top, as shown in FIG. 16. As a result, the top 22a (indicated in dotted lines in FIG. 1) of the engaging head 22' is shaped so as to have a substantially flat top surface P and a pair of opposite side protuberances 22a' (indicated solid lines in FIGS. 1 through 3). The flat top surface P may be slightly depressed at its central area due to the subsequent cooling, depending on the molding conditions.

In this invention, the molded surface fastener SF having passed through the heating means 8 is slowly cooled at normal temperature without using separate cooling means, whereupon the molded surface fastener SF is wound up in a roll to finalize the manufacturing. In this invention, it is important to heat and press the top of the engaging element 2 and to slowly cool the top 22a including the protuberances 22a'. Namely, while the heated top 22a of the engaging head 22 softened by being heated and deformed by pressing is cooled slowly, the heated portion becomes crystallized to have an increased degree of rigidness as compared to the stem 21

Figure 19:
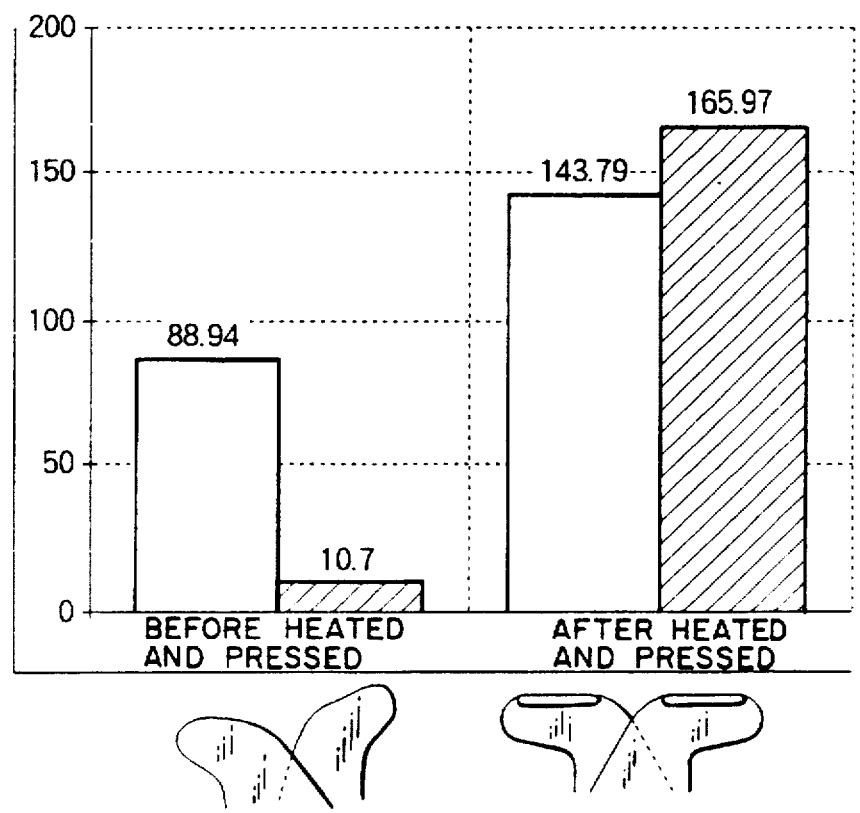
FIG. 19 is a graph showing the results of peeling strength tests of the molded surface fastener before and after the heating and pressing process.

Since only the engaging head 22' has a high degree of rigidness as compared to the substrate sheet 1' and the majority of the engaging element 2', it is possible to secure adequate resistance against peeling from the companion loops, though the engaging elements 2 are minute in size and very high in softness, as the rigidity of the engaging heads 23 is secured. On the other hand, since a strength of a treating direction of the substrate sheet 1, can be secured in the case that the stem 21 has a pair of reinforcing ribs 23 on its opposite surface even if the engaging element 2 has a single head as in this invention, the resulting molded surface fastener SF is a high quality product having a less itchy touch on its engaging surface and an adequate degree of engaging strength, though excellent in softness and minute in size but rigid at the engaging head 22, guaranteeing good durability for repeated use. FIG. 19 is a graph in which the peeling strength of the engaging element 2 having processed with the heating and pressing process is compared with that of the unprocessed engaging element 2' right after having been drawn of f the die wheel 5 and before having been processed with the heating and pressing process. Given that after the top 22a of the engaging head 22 has been heated and pressed, it is understood from this graph that the peeling strength of the engaging element 2 has an sharply increased degree of peeling strength as compared to the unprocessed engaging element 2'.

According to the embodiments of this invention in which the engaging element 2 has a substantially invented 2 shape, when the engaging element 2' drawn off the die wheel 5 does not restore to its original shape, which is that of the individual L-shape engaging-element-forming cavity 51, and assumes an increased angle of bending as compared to that of the engaging-element-forming cavity 51, as shown in FIGS. 17A and 17B. Further, because of its greater resistance when drawing from the corresponding cavity 51, the forward engaging head 22' of FIG. 17B is larger in angle of bending than the reverse engaging head 22' of FIG. 17A.

Figure 18A:
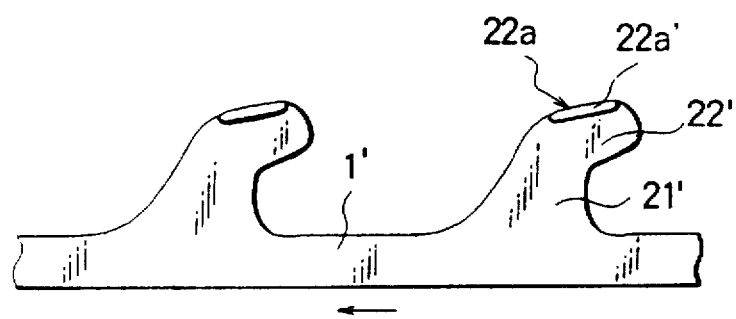
FIGS. 18A and 18B are fragmentary side views showing the respective shapes of the forward and reverse engaging elements after the heating and pressing process.
Figure 18B:
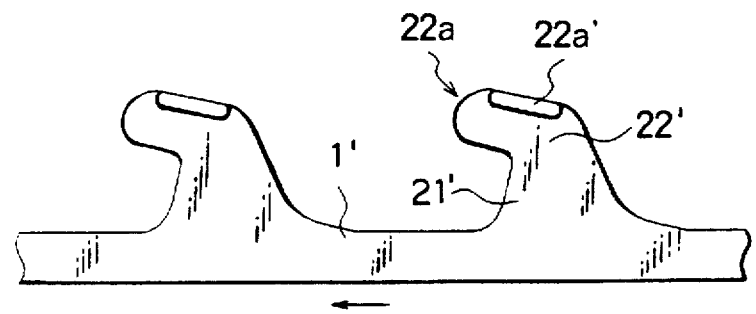

In the experiments of the present inventors, a discovery was made that the difference in restoration of shape after drawing from the die wheel 5 is reflected interestingly on the physical property of the engaging element 2 after being processed to form the protuberances 22a', as shown in FIG. 19. According to the graph of FIG. 19, in the shape of the engaging element 2' before the heating and pressing process as shown in FIGS. 17A and 17B, the difference in angle of bending between the forward and reverse engaging heads 22' is directly reflected on the difference in peeling strength between the forward and reverse engaging heads 22'. In the engaging element 2 after the heating and pressing process as shown in FIGS. 18A and 18B, the difference in angle of bending between the forward and reverse engaging heads 22 is reduced, and the peeling strength of the forward engaging head 22 is increased sharply as compared to that of the reverse engaging head 22.

Namely, the generally inverted L-shape engaging element 2 in which the forward engaging head 22' is deformed more increases sharply in peeling strength after the protuberances 22a' have been formed, as compared to the engaging element 2 in which the reverse engaging head 22' is deformed less in angle of bending. With this physical property change in view, if the angle of bending of the individual reverse-engaging-head-forming cavity 51 in the circumferential surface of the die wheel 5 is previously set to be larger than that of the individual forward-engaging-head-forming cavity 51, it is possible to secure substantially the same peeling strength for either the engaging element 2 having the forward engaging head 22' or the engaging element 2 having the reverse engaging head 22'.

Figure 20:
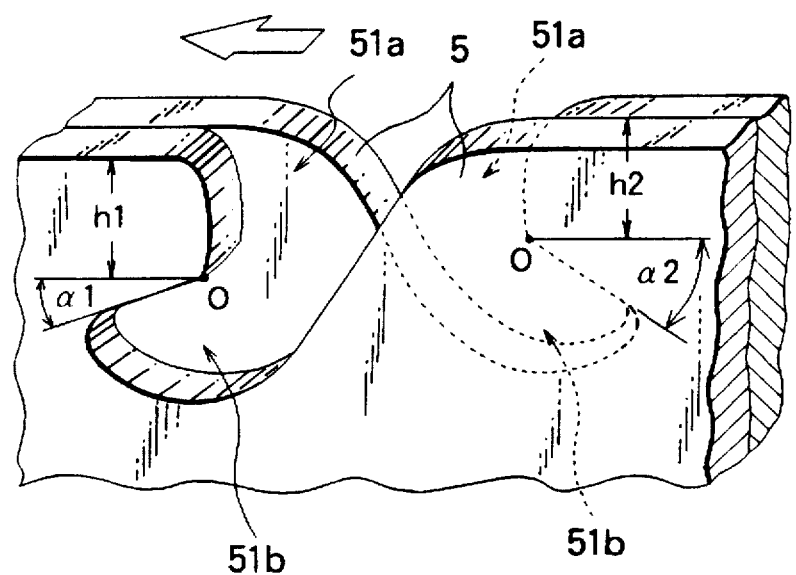
FIG. 20 is a perspective view showing a preferable example of shape of an engaging-element-forming cavity.

FIG. 20 schematically shows in the same plate a preferred shape of engaging-element-forming cavity 51 in which a difference is previously set between the angle α1 of bending of the forward-engaging-head-forming cavity 51b and the angle α2 of bending of the reverse-engaging-head-forming cavity. In order not to give a difference in shape between the tops 22a the forward and reverse engaging heads 22 after the heating and pressing process, it is preferable that, in addition to the setting of the different bending angles α1 and α2, a difference is given between a depth h1 of the bending start point 0 of the forward-engaging-head- forming cavity 51b with respect to the corresponding stem-forming cavity 51a standing from the opening of the circumferential surface of the die wheel 5 in its radius direction and a depth h2 of the bending start point 0 of the reverse-engaging-head-forming cavity 5b with respect to the corresponding stem-forming cavity 51a. Preferably, the angle α1 of bending of the forward-engaging head-forming cavity 51b is −5°−+80° while the angle α2 of bending of the reverse-engaging-head-forming cavity 51b is +10°−+90°. The ratio of the depths h1 and h2 is preferably about 1:1.01–1:1.50. Of course, these bending angles and depth ratios depend on the substance of the resin to be used and therefore should by no means be limited to particular numeral values but tend be approximated to the illustrated numeral values.

In the illustrated numeral examples, the angle α1 of bending of the forward engaging-element-forming cavity 51 is 10 the depth h1 of the stem-forming cavity 51a of the forward-engaging-element-forming cavity 51 is 0.20 mm, the angle α2 of bending of the reserve-engaging-element-forming cavity 51 is 27°, and the depth h2 of the stem-forming cavity 51a of the reverse-engaging-element-forming cavity 51 is 0.23 mm.

Figure 21:
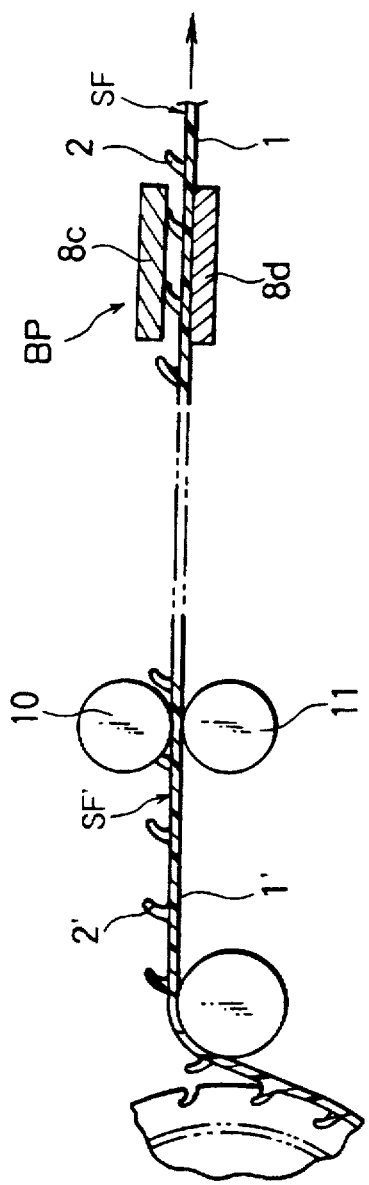
FIG. 21 is a view showing a schematic structure of an apparatus for continuously manufacturing the molded surface fastener using a protuberance forming station according to a second embodiment of the apparatus of the invention.

FIG. 21 is a vertical cross-sectional view of, an apparatus for continuously manufacturing the molded surface fastener using a modified form of heating and pressing means 8. This embodiment is substantially identical in entire construction with the foregoing embodiment except the protuberance forming station. In this illustrated example, upper and lower plates 8c, 8d are used as the heating and pressing means 8. The upper plate 8c has a non-illustrated heating source heater and can thereby be heated up to a resin softening temperature, and the vertical position of the upper plate 8c can be adjusted by a non-illustrated vertical-position adjuster. The lower plate 8d is fixed in such a manner that its upper surface is positioned in alignment with the path of travel of the primary-intermediate surface fastener SF'. The upper plate 8c is disposed at a level slightly lower than the plane in which the engaging head 22' of he engaging element 2' of the primary-intermediate surface fastener SF' travels. This setup position is decided by an estimated length of the opposite protuberances 22a' bulging from the top 22a of the engaging head 22 of the engaging element 2 according to this invention.

According to this embodiment having the foregoing structure, after the primary-intermediate surface fastener SF' continuously molded on a non-illustrated die wheel in rotation is moved arcuately with rotation of the die wheel, it is continuously separated from the circumferential surface of the die wheel as positively drawn by the take-up rollers 10, 11. As it is moved arcuately with the die wheel, this primary intermediate surface fastener SF' is quickly cooled by a non-illustrated cooling water jacket mounted in the die wheel and a non-illustrated cooling water bath disposed under the die wheel. This quick solidification makes the primary-intermediate surface fastener SF' high in softness.

After opposite edges of the primary-intermediate surface fastener SF' have been cut off by a non-illustrated trimming unit, the thus molded primary-intermediate surface fastener SF' is moved through and between the upper and lower plates 8c, 8d serving as the heating and pressing means. During that time, the top 22a of the engaging head 22, which is indicated by dotted lines in FIG. 8, is heated and pressed by the upper heating plate 8c, and the engaging element 2 deforms to bend slightly toward the downstream side from its line to distal end as indicated by a solid lines in FIG. 8. Further, the top 22a deforms as softened from its upper point to form a pair of transverse protuberances 22a' bulging in opposite directions from opposite sides of the flat top surface and is slowly cooled and solidified, as in the previous embodiment, as a result, the rigidity of the protuberances 22a' and the circumferential portions thereof increases, so that ideal engaging elements 2 having the same shape and function as those of the first structural example are obtained.

Figure 22:
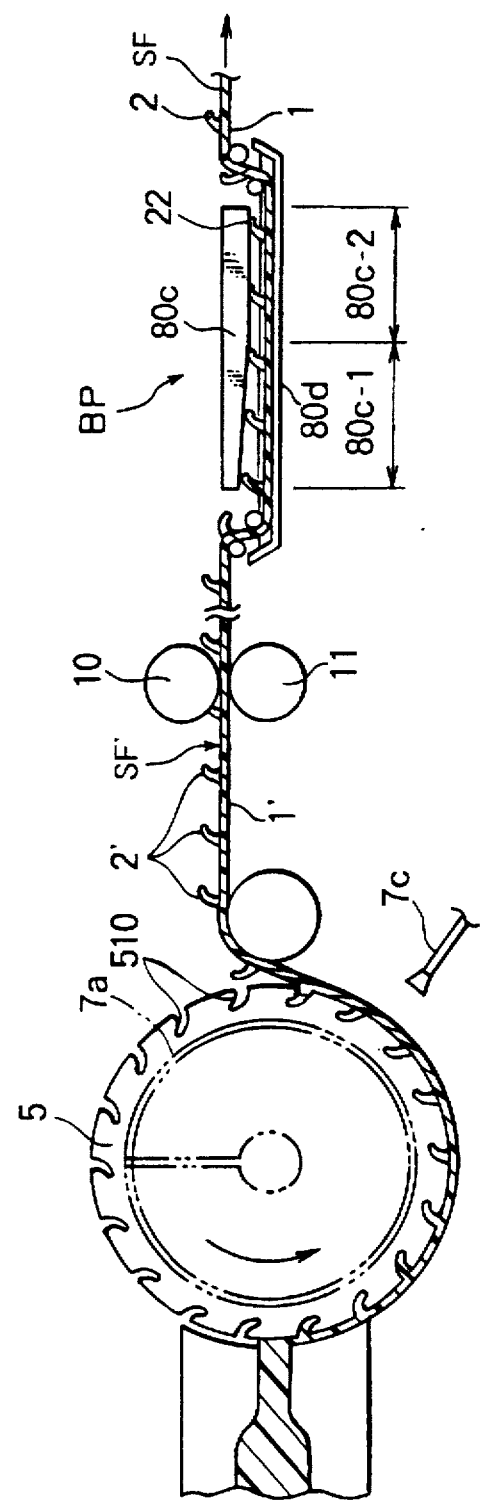
FIG. 22 is a view showing a schematic structure of an apparatus for continuously manufacturing the molded surface fastener using a modified protuberance forming station according to a third embodiment of the apparatus.

FIG. 22 is an overall view schematically showing a structure of an another apparatus for continuously manufacturing the molded surface fastener using a modified protuberance forming station. This embodiment is differentiated from the first and second embodiments in that the individual engaging-element-forming cavity 510 extends substantially merely straightway and is slightly inclined with respect to a radial direction a die wheel 5, not assuming a substantially inverted L shape. The basic structure of the remaining units or devices of the embodiment is identical with the second embodiment except that an upper heating plate 80c and a lower water tank 80d are used as heating and pressing means 80.

Since each of the engaging elements 2' standing in an inclined posture on the substrate sheet 1' of the primary intermediate surface fastener SF' is merely substantially straight, the height of the inlet end of the upstream part 80c-1 of the upper plate 80c is set at the same level as that of the upper end of the engaging element 2'. Further, the distance between the bottom surface of the upper plate 80c and water level in the lower water bath 80d is made so as to gradually decreases toward a central position of the upper plate 80c along a path of travel of the surface fastener SF' and to be uniform along the downstream part 80c-2. When it travels along the upstream part 80c-1 of the upper plate 80c, the substantially straight engaging head 22' is bent by the upper plate 80c; then when it travels along the downstream part 80c-2 of the upper plate 80c, the top 22a of the bent engaging head 22' is gradually heated and pressed by the upper plate 80c to form a pair of protuberances bulging in opposite directions from opposite side edges of the top 22a. Though the upper plate 80c is necessarily heated, the engaging head 22' would be bent too quickly, and also its quality would be deteriorated if the upstream part 80c-1 is heated at high temperature. In order to avoid the overheating, the temperature of the upstream part 80c-1 is set to be at a predetermined gradient until the bending of the engaging head 22' at the upstream part 80c-1 is completed, and in the meantime, the downstream part 80c-2 is heated at a resin softening temperature likewise the foregoing embodiments.

In this embodiment having such a structure 9, when the primary-intermediate surface fastener SF' molded by the die wheel 5 arrives at a position between the upper plate 8c and the lower water bath 80d, the substantially straight substrate sheet 1' and stems 21' are moved in cooling water in the lower water bath 80d via guide rollers, during which a branch of the engaging head 22' is heated at a temperature lower than a resin softening temperature and is gradually bent into a substantially inverted L shape by the upstream part 80c-1of the upper plate 80c. As a result, the individual engaging heads 22' are bent with respect to the corresponding stems 21' uniformly at a common predetermined bending start point. Specifically, since the substrate sheet 1' and the stems 21' are under cooling, they do not become softened due to the heated upper plate 80c so that only the engaging heads 22' above a predetermined level can be bent into a uniform shape. This water cooling method is only an illustrative example, and for accomplishing the same purpose, the engaging element 2' may have an easily bendible portion.

The substantially L-bent engaging element 2' is then softened at a softening temperature and is deformed, as pressed by the downstream part 80c-2 of the heated upper plate 80c, to form the protuberances 22a' which is a characterizing part of this invention. The molded surface fastener SF passed the downstream part 80c-2 is then moved through a slow cooling section, which is at a normal temperature, so that the engaging head 22 would have an increased degree of rigidness as compared to the remaining portions of the surface fastener SF, as previously described.

As is apparent from the foregoing description, according to the apparatus of this invention, it is possible to efficiently manufacture a molded surface fastener SF, which is composed of a multiplicity of unique inverted L-shape engaging elements 2 standing on a substrate sheet, each having a pair of protuberances 22a' bulging from opposite side edges of a substantially flat top surface P, without requiring a complex process. With such a shape of each engaging element 2, partly since the engaging head 22 extend substantially straightly from the upper end of the stem, the engaging head 2 has a less itchy touch. Further, since the engaging head 22 can be inclined by an angle more than $85d°$ with respect to the stem 21, the engaging head 22 would tend to come into the companion loop 3. Still further, because of the opposite side protuberances of the engaging head 22, it is possible to secure adequate engaging strength. As a result, reliable engagement can be retained even with the minute-size companion loops 3, and the protuberances 2a' serve to hold the loops 3 in sure engagement against peeling force which is extend during the engagement. With peeling, the engaging head 22a' bends to flex the stem 21 in the peeling direction so that the loops 3 are allowed to move smoothly in the removing direction along the edges of the protuberances 22a' with adequate friction, thus facilitating removing the loops 3 from the engaging head 22.

According to the unique shape of the engaging element having the protuberances 22 bulging from the top 22a, it is possible to give the top surface of the engaging head 22 a less itchy touch and to secure adequate reliable engagement even with minute-size companion loops 3. Further, unlike the conventional mushroom-type engaging element having an umbrella-shape engaging head projecting in all directions from the upper end of the stem, it is possible to secure a required degree of peeling strength and smooth separation, in spite of the minute size of the engaging heads, without causing occurrence of a so-called hanging phenomenon in which the neck between the stem and the engaging bead gets entangled with the loops and hence causes damages to either the engaging elements 2 or the loops 3, so that an improved degree of durability can be achieved.

If the primary surface between SF is molded and solidified by cooling it quickly, but the engaging head heated and pressed to form a pair of protuberances is solidified by slow cooling, it is possible to secure an adequate degree of softness for the whole molded surface fastener and to increase the engaging head in rigidness as compared to the remaining portions of the surface fastener, thus causing an excellent degree of peeling resistance and guaranteeing adequate shape stability.

What is claimed is:

1. A method of manufacturing a molded surface fastener having a substrate sheet and a multiplicity engaging elements standing on one surface of substrate sheet, each of the engaging elements being composed of a stem rising from the one surface of said substrate sheet, and an engaging head projecting from an upper end of the stem for detachably engaging a companion loop, said method comprising the steps of:

(a) molding a primary-intermediate of the surface fastener with the engaging head of each engaging element projecting from the upper end of the stem;

(b) positively cooling the molded primary-intermediate surface fastener having the molded engaging elements;

(c) continuously moving the cooled and solidified primary-intermediate surface fastener to heating and pressing means;

(d) heating and pressing a top of the engaging head from an upper side thereof by said heating and pressing means to soften the engaging head and, at the same time, to form a pair of protuberances bulging from the top of the engaging head perpendicularly with respect to a direction lengthwise of the engaging head; and (e) slowly solidifying the molded surface fastener having passed said heating and pressing means.

2. A method according to claim 1, wherein a bending angle of the engaging head with respect to said stem is about 80°~170°.

* * * * *